(12) United States Patent
Littlefield et al.

(10) Patent No.: US 10,533,640 B2
(45) Date of Patent: Jan. 14, 2020

(54) TWO RATIO ELECTRIC DRIVE UNIT

(71) Applicant: GM Global Technology Operations LLC, Detroit, MI (US)

(72) Inventors: Joseph R. Littlefield, Sterling Heights, MI (US); Craig S. Ross, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 441 days.

(21) Appl. No.: 15/641,359

(22) Filed: Jul. 5, 2017

(65) Prior Publication Data
US 2019/0011018 A1 Jan. 10, 2019

(51) Int. Cl.
| | |
|---|---|
| *F16H 3/66* | (2006.01) |
| *F16H 3/10* | (2006.01) |
| *F16H 3/091* | (2006.01) |
| *F16H 3/089* | (2006.01) |
| *F16H 3/36* | (2006.01) |

(52) U.S. Cl.
CPC .............. *F16H 3/66* (2013.01); *F16H 3/089* (2013.01); *F16H 3/091* (2013.01); *F16H 3/10* (2013.01); *F16H 3/363* (2013.01); *F16H 2200/0021* (2013.01); *F16H 2200/201* (2013.01); *F16H 2200/2005* (2013.01); *F16H 2200/2007* (2013.01); *F16H 2200/2023* (2013.01); *F16H 2200/2035* (2013.01); *F16H 2200/2069* (2013.01); *F16H 2200/2084* (2013.01); *F16H 2200/2097* (2013.01)

(58) Field of Classification Search
CPC ..... F16H 2200/0021; F16H 2200/2005; F16H 2200/2007; F16H 2200/201; F16H 2200/2023; F16H 2200/2035; F16H 2200/2069; F16H 2200/2084; F16H 2200/2097; F16H 3/089; F16H 3/091; F16H 3/10; F16H 3/363; F16H 3/66
See application file for complete search history.

(56) References Cited

U.S. PATENT DOCUMENTS

| | | | | |
|---|---|---|---|---|
| 9,156,348 | B1 * | 10/2015 | Swales | B60K 17/046 |
| 9,994,225 | B1 * | 6/2018 | Lee | B60K 6/445 |
| 2011/0183806 | A1 * | 7/2011 | Wittkopp | F16D 7/028 |
| | | | | 475/263 |
| 2017/0001686 | A1 * | 1/2017 | Hayslett | B62M 6/55 |
| 2017/0137085 | A1 * | 5/2017 | Yamamoto | B62M 11/145 |
| 2019/0078674 | A1 * | 3/2019 | Dzafic | B60K 1/00 |

\* cited by examiner

*Primary Examiner* — Jacob S. Scott
(74) *Attorney, Agent, or Firm* — Harness, Dickey & Pierce, P.L.C.

(57) ABSTRACT

A powertrain includes an electric motor and a first planetary gear stage having a first rotatable member drivingly connected to the electric motor and at least one second rotatable member. A second planetary gear stage includes a third rotatable member drivingly connected to the at least one second rotatable member and includes at least one fourth rotatable member. One of the third rotatable member and the at least one fourth rotatable member is connected to an output member. A passive one-way clutch and a selectable one-way clutch are associated with at least one of the first and second planetary gear stages for varying operation of the first and second planetary gear stages based upon an operation state of the selectable one-way clutch and a direction of rotation of the electric motor.

21 Claims, 13 Drawing Sheets

TWO RATIO ELECTRIC DRIVE UNIT

FIELD

The present disclosure relates to a powertrain for an electrified vehicle and more particularly to a two-ratio electric drive unit.

BACKGROUND AND SUMMARY

This section provides background information related to the present disclosure which is not necessarily prior art.

Most automobiles in current use are driven by fuel engines which experience a great deal of mechanical loss and have low energy efficiency, thereby consuming a lot of energy and causing environmental pollution. Electric vehicles operate using stored electric energy for powering an electric motor. As battery technology has improved, the popularity of hybrid electric and electric vehicles has increased over the last several years. However, the packaging requirements for traditional electric motor drive systems have influenced the vehicle designs and efficiency.

Vehicle packaging is continually pushing for increased torque density, which presents increased risk of overvoltage of the system during uncontrolled generation. The electric drive unit of the present disclosure combines one passive one-way clutch with a selectable one-way clutch to achieve a high drive ratio, high-speed regeneration capability, and fast shift times, while significantly reducing the risk of overvoltage.

A powertrain includes an electric motor and a first planetary gear stage having a first rotatable member drivingly connected to the electric motor and at least one second rotatable member. A second planetary gear stage includes a third rotatable member drivingly connected to the at least one second rotatable member and includes at least one fourth rotatable member. One of the third rotatable member and the at least one fourth rotatable member is connected to an output member. A passive one-way clutch and a selectable one-way clutch are associated with at least one of the first and second planetary gear stages for varying operation of the first and second planetary gear stages based upon an operation state of the selectable one-way clutch and a direction of rotation of the electric motor. This results in a high ratio in the positive torque (drive) direction and a lower ratio in the negative torque (regeneration) direction. The selectable one-way clutch is a 2-state device that is opened to allow driving in the reverse direction or to reduce system losses at high speeds. By having the selectable one-way clutch closed, the system can provide torque for all-wheel-drive maneuvering without actuation delay. In the case of uncontrolled generation, the system goes into a negative torque case, loading the passive one-way clutch and the ratio is reduced automatically. This significantly reduces the risk of over voltage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
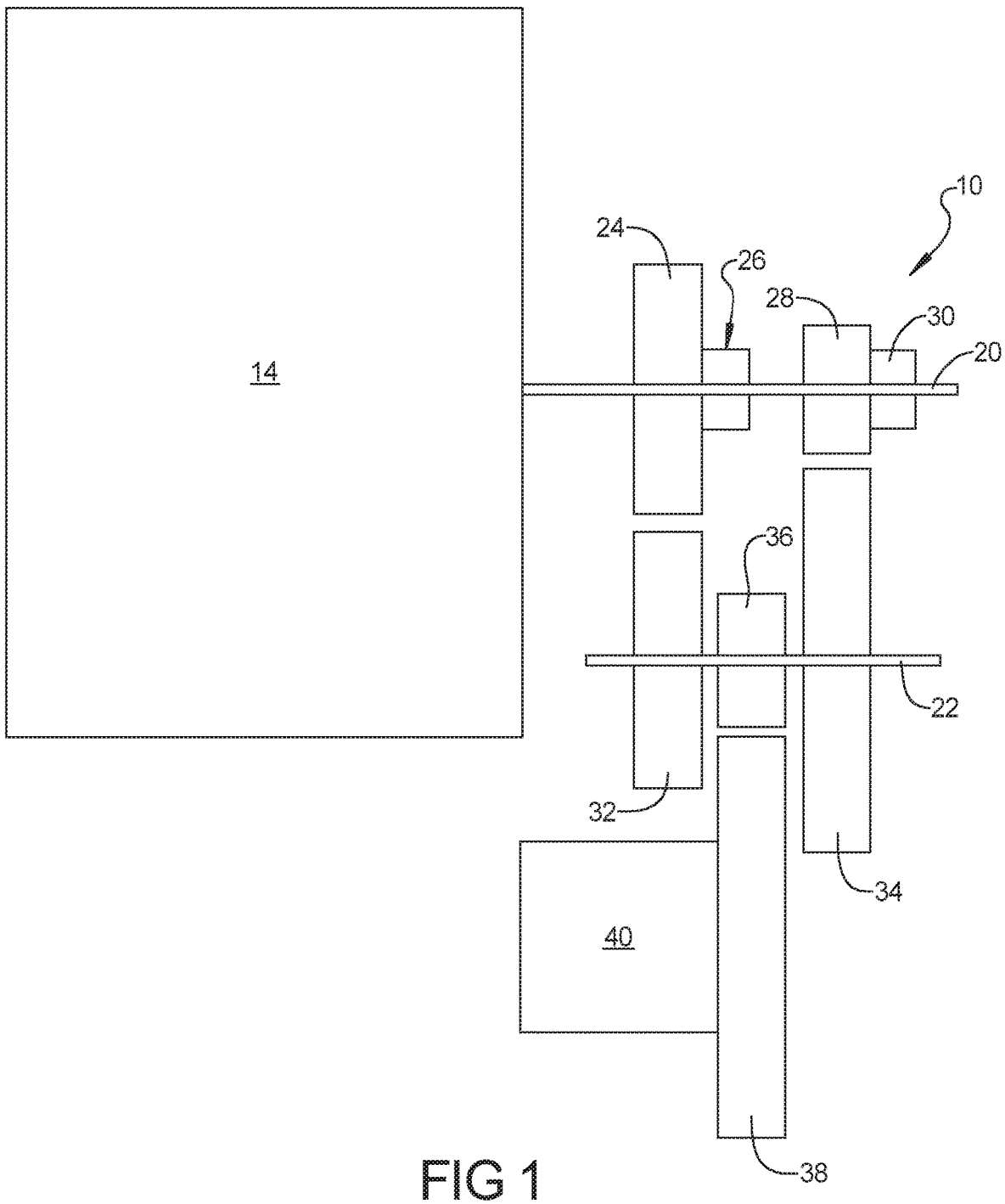
FIG. 1 is a schematic illustration of a powertrain with an electric drive unit.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Referring to the drawings, wherein like reference numerals refer to like components throughout the views, FIG. 1 shows a powertrain 10 such as for a vehicle. The powertrain 10 includes a single electric motor 14 that is configured to operate as a motor and may also be configured to operate as a generator.

The electric motor 14 includes a drive shaft 20 and a lay shaft 22. A first drive gear 24 is connectable to the drive shaft 20 by a passive one-way clutch 26. A second drive gear 28 is connectable to the drive shaft 20 by a selectable one-way clutch 30. A first driven gear 32 and a second driven gear 34 are connected to the lay shaft 22 and in meshing engagement with the first and second drive gears 24, 28, respectively. An output gear 36 is mounted to the lay shaft 22 and is in meshing engagement with a driven gear 38 for providing drive torque to an axle drive system 40 which includes a differential.

The selectable one-way clutch 30 is operable in a closed state to provide high drive torque and is operable to an open state to drive the powertrain 10 in reverse. The one-way clutch 26 allows the powertrain 10 to operate in reverse and to provide regeneration at a low speed ratio.

Figure 2:
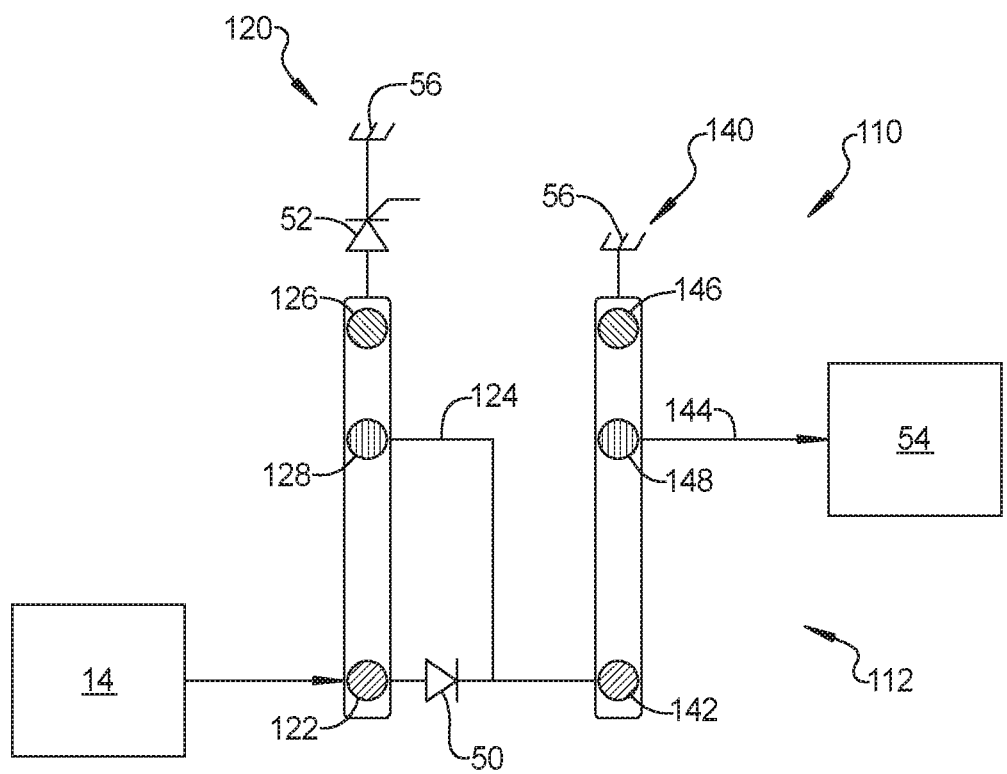
FIG. 2 is a schematic illustration in lever diagram form of a powertrain with an electric drive unit in accordance with an alternative aspect of the present teachings.

With reference to FIG. 2, an alternative powertrain 110 for a vehicle is shown in lever diagram form. The powertrain 110 includes an electric drive unit 112 that includes a single electric motor 14 that is configured to operate as a motor and may also be configured to operate as a generator.

The electric drive unit 112 further includes a first planetary gear stage 120 and a second planetary gear stage 140 represented in lever form in FIG. 2. The first planetary gear stage 120 includes a sun gear member 122, a planetary carrier member 124 and a ring gear member 126. As is known in the art, the carrier member 124 supports a plurality of planetary gears 128 in meshing engagement with the sun gear member 122 and the ring gear member 126. In the embodiment of FIG. 2, the electric motor 14 is drivingly connected to the sun gear member 122. The ring gear member 126 is connectable to ground 56 by a selectable one-way clutch 52. The sun gear member 122 of the first planetary gear stage 120 is connected to the planetary carrier member 124 of the first planetary gear stage 120 and to a sun gear member 142 of the second planetary gear stage 140 by a one-way clutch 50. A ring gear 146 of the second planetary gear stage 140 is non-rotatably fixed to the housing 56. A planetary carrier member 144 of the second planetary gear stage 140 supports a plurality of planetary gears 148 in meshing engagement with the sun gear member 142 and the ring gear member 146 and is drivingly connected to an axle drive system 54 which includes a differential.

The selectable one-way clutch 52 is operable in a closed state to provide high drive torque and is operable to an open state to drive the powertrain 10 in reverse. The one-way clutch 50 allows the powertrain 110 to operate in reverse and to provide regeneration at a low speed ratio.

Figure 3:
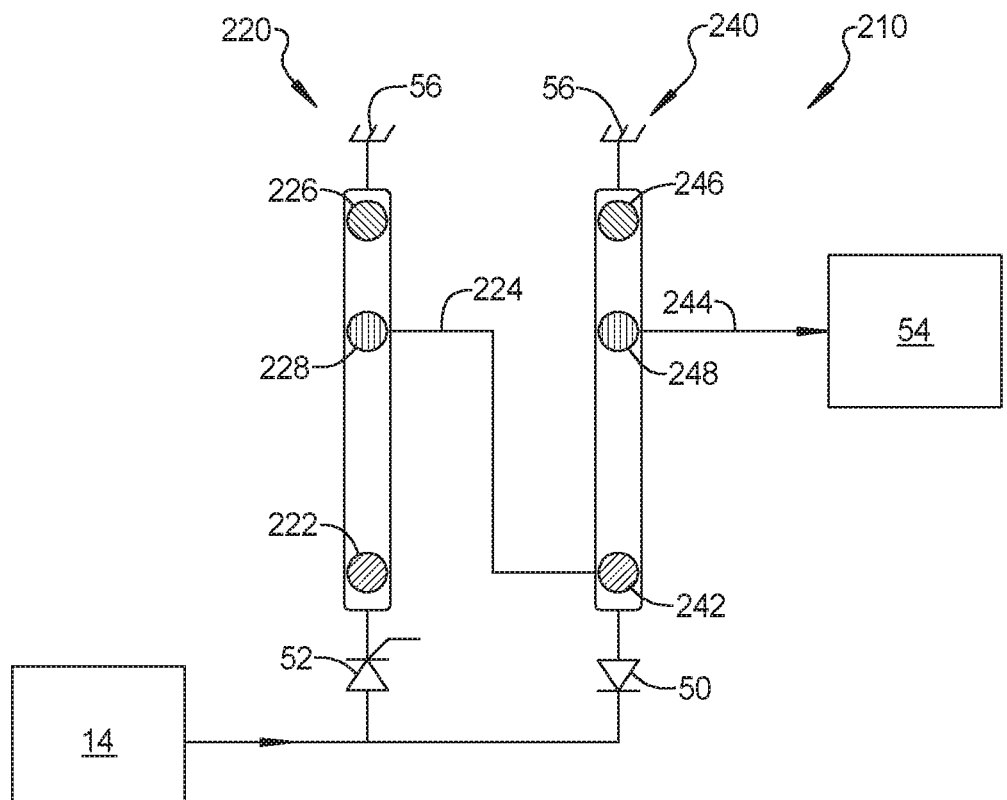
FIG. 3 is a schematic illustration in lever diagram form of a powertrain with an electric drive unit in accordance with an alternative aspect of the present teachings.

With reference to FIG. 3, an alternative powertrain 210 is shown for a vehicle. The powertrain 210 includes an electric drive unit that includes a single electric motor 14 that is configured to operate as a motor and may also be configured to operate as a generator.

The powertrain 210 further includes a first planetary gear stage 220 and a second planetary gear stage 240 represented in lever form in FIG. 3. The first planetary gear stage 220 includes a sun gear member 222, a planetary carrier member 224 and a ring gear member 226. As is known in the art, the carrier member 224 supports a plurality of planetary gears 228 in meshing engagement with the sun gear member 222 and the ring gear member 226. In the embodiment of FIG. 3, the electric motor 14 is drivingly connected to the sun gear member 222 by a selectable one-way clutch 52. The ring gear member 226 is non-rotatably connected to housing 56. The electric motor 14 is connected to a sun gear member 242 of the second planetary gear stage 140 by a one-way clutch 50. A ring gear 246 of the second planetary gear stage 240 is non-rotatably fixed to the housing 56. A planetary carrier member 244 of the second planetary gear stage 240 supports a plurality of planetary gears 248 in meshing engagement with the sun gear member 242 and the ring gear member 246 and is drivingly connected to an axle drive system 54 which includes a differential.

The selectable one-way clutch 52 is operable in a closed state to provide high drive torque and is operable to an open state to drive the powertrain 210 in reverse. The one-way clutch 50 allows the powertrain 210 to operate in reverse and to provide regeneration at a low speed ratio.

Figure 4:
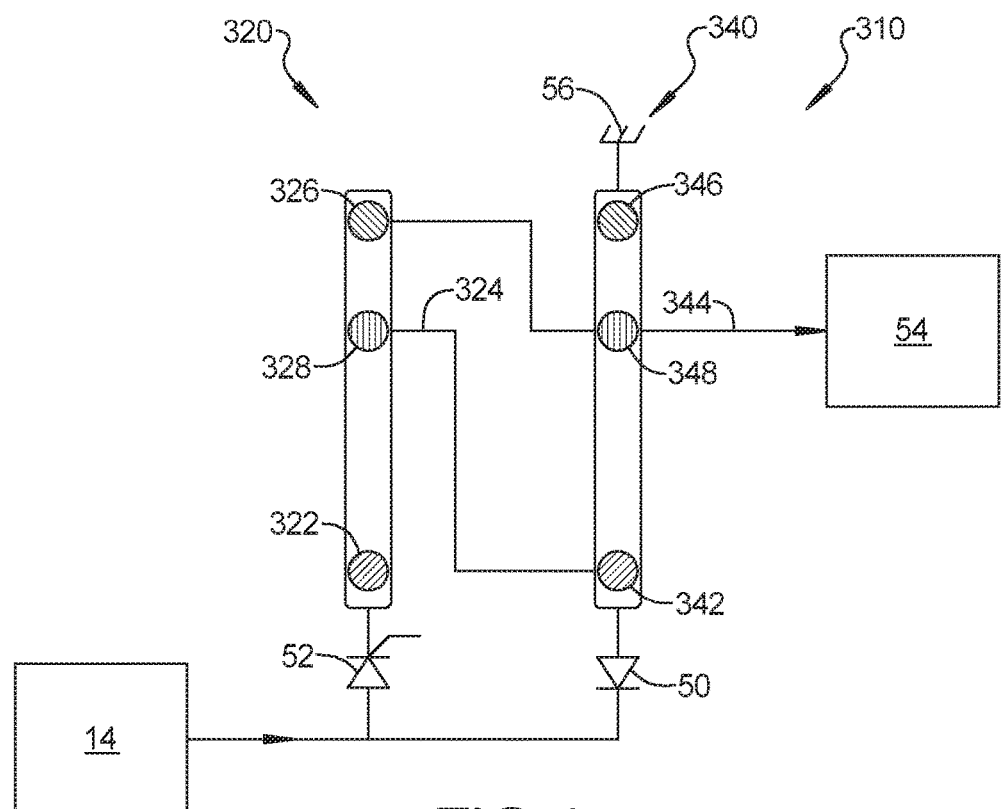
FIG. 4 is a schematic illustration in lever diagram form of a powertrain with an electric drive unit in accordance with an alternative aspect of the present teachings.

With reference to FIG. 4, an alternative powertrain 310 is shown for a vehicle. The powertrain 310 includes an electric drive unit that includes a single electric motor 14 that is configured to operate as a motor and may also be configured to operate as a generator.

The powertrain 310 further includes a first planetary gear stage 320 and a second planetary gear stage 340 represented in lever form in FIG. 4. The first planetary gear stage 320 includes a sun gear member 322, a planetary carrier member 324 and a ring gear member 326. As is known in the art, the carrier member 324 supports a plurality of planetary gears 328 in meshing engagement with the sun gear member 322 and the ring gear member 326. In the embodiment of FIG. 4, the electric motor 14 is drivingly connected to the sun gear member 322 by a selectable one-way clutch 52. The electric motor 14 is also drivingly connected to a sun gear member 342 of the second planetary gear stage 340 by one-way clutch 50. The ring gear member 326 is drivingly connected to a planetary carrier member 344 of the second planetary gear stage 340. The planetary carrier member 324 of the first planetary gear stage 320 is connected to the sun gear member 342 of the second planetary gear stage 340. A ring gear 346 of the second planetary gear stage 340 is non-rotatably fixed to the housing 56. The planetary carrier member 344 of the second planetary gear stage 340 supports a plurality of planetary gears 348 in meshing engagement with the sun gear member 342 and the ring gear member 346 and is drivingly connected to an axle drive system 54 which includes a differential.

The selectable one-way clutch 52 is operable in a closed state to provide high drive torque and is operable to an open state to drive the powertrain 310 in reverse. The one-way clutch 50 allows the powertrain 310 to operate in reverse and to provide regeneration at a low speed ratio.

Figure 5:
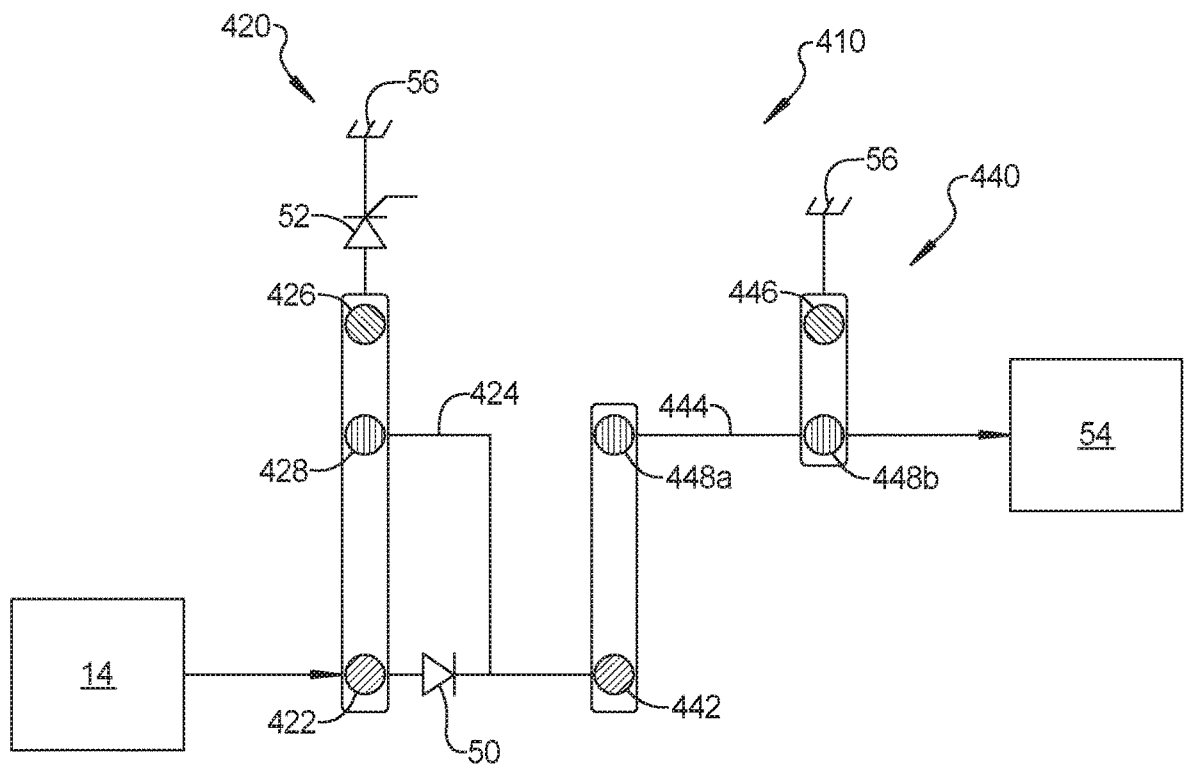
FIG. 5 is a schematic illustration in lever diagram form of a powertrain with an electric drive unit in accordance with an alternative aspect of the present teachings.
Figure 6:
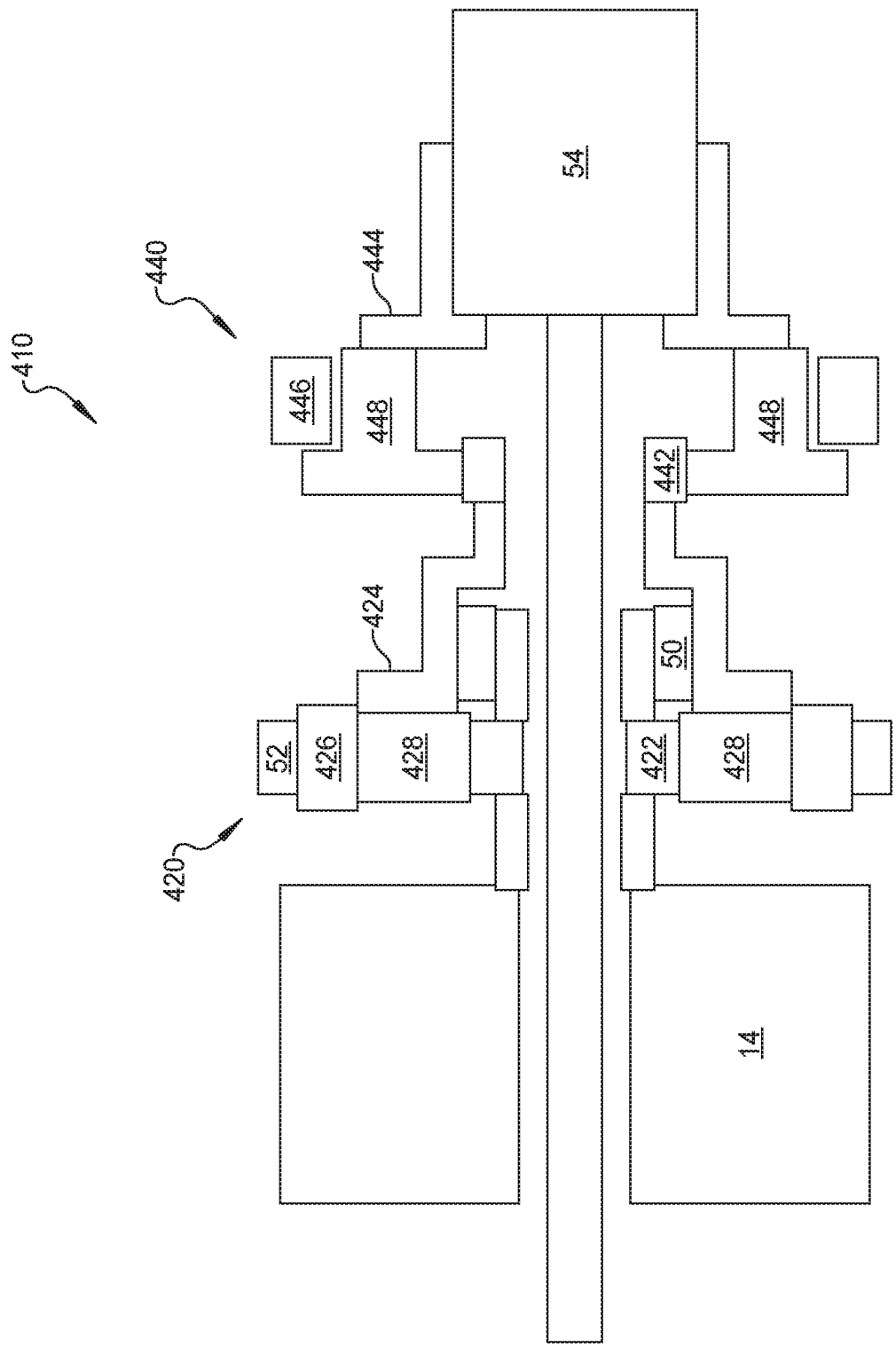
FIG. 6 is a schematic illustration in stick diagram form of the powertrain of FIG. 5.

With reference to FIGS. 5 and 6, an alternative powertrain 410 is shown for a vehicle. The powertrain 410 includes an electric drive unit that includes a single electric motor 14 that is configured to operate as a motor and may also be configured to operate as a generator.

The powertrain 410 further includes a first planetary gear stage 420 and a second planetary gear stage 440 represented in lever form in FIG. 5. The first planetary gear stage 420 includes a sun gear member 422, a planetary carrier member 424 and a ring gear member 426. As is known in the art, the carrier member 424 supports a plurality of planetary gears 428 in meshing engagement with the sun gear member 422 and the ring gear member 426. In the embodiment of FIG. 5, the electric motor 14 is drivingly connected to the sun gear member 422. The ring gear member 426 is connectable to ground by a selectable one-way clutch 52. The sun gear member 422 of the first planetary gear stage 420 is connected to the planetary carrier member 424 of the first planetary gear stage 420 and to a sun gear member 442 of the second planetary gear stage 440 by a one-way clutch 50. A ring gear 446 of the second planetary gear stage 440 is non-rotatably fixed to the housing 56. A planetary carrier member 444 of the second planetary gear stage 440 supports a plurality of stepped planetary gears 448 in meshing engagement with the sun gear member 442 and the ring gear member 446 and is drivingly connected to an axle drive system 54 which includes a differential.

The selectable one-way clutch 52 is operable in a closed state to provide high drive torque and is operable to an open state to drive the powertrain 410 in reverse. The one-way clutch 50 allows the powertrain 410 to operate in reverse and to provide regeneration at a low speed ratio.

Figure 7:
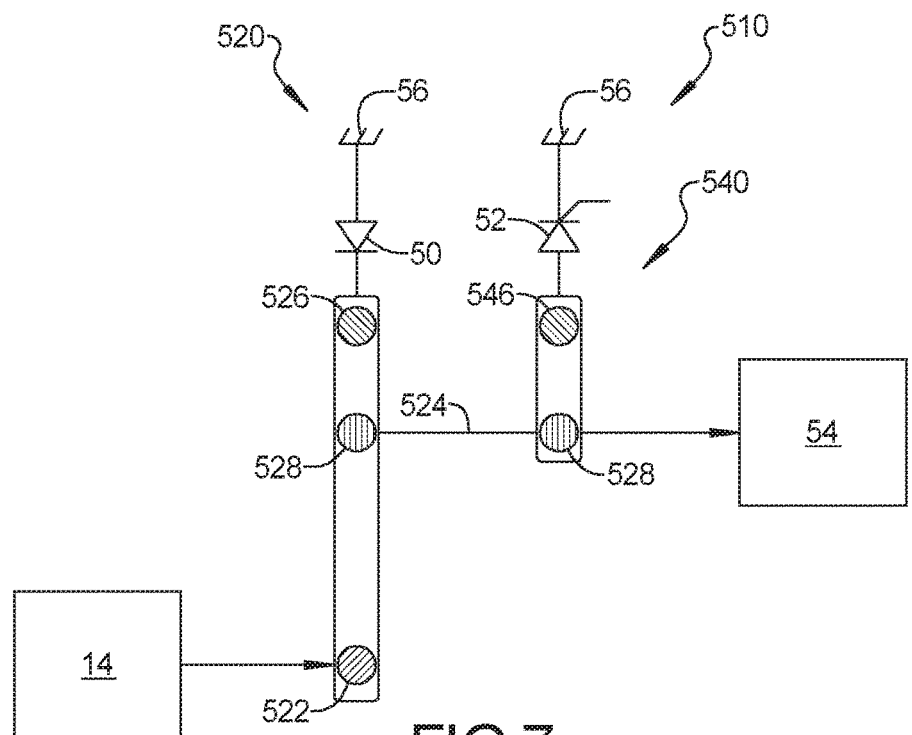
FIG. 7 is a schematic illustration in lever diagram form of a powertrain with an electric drive unit in accordance with an alternative aspect of the present teachings.
Figure 8:
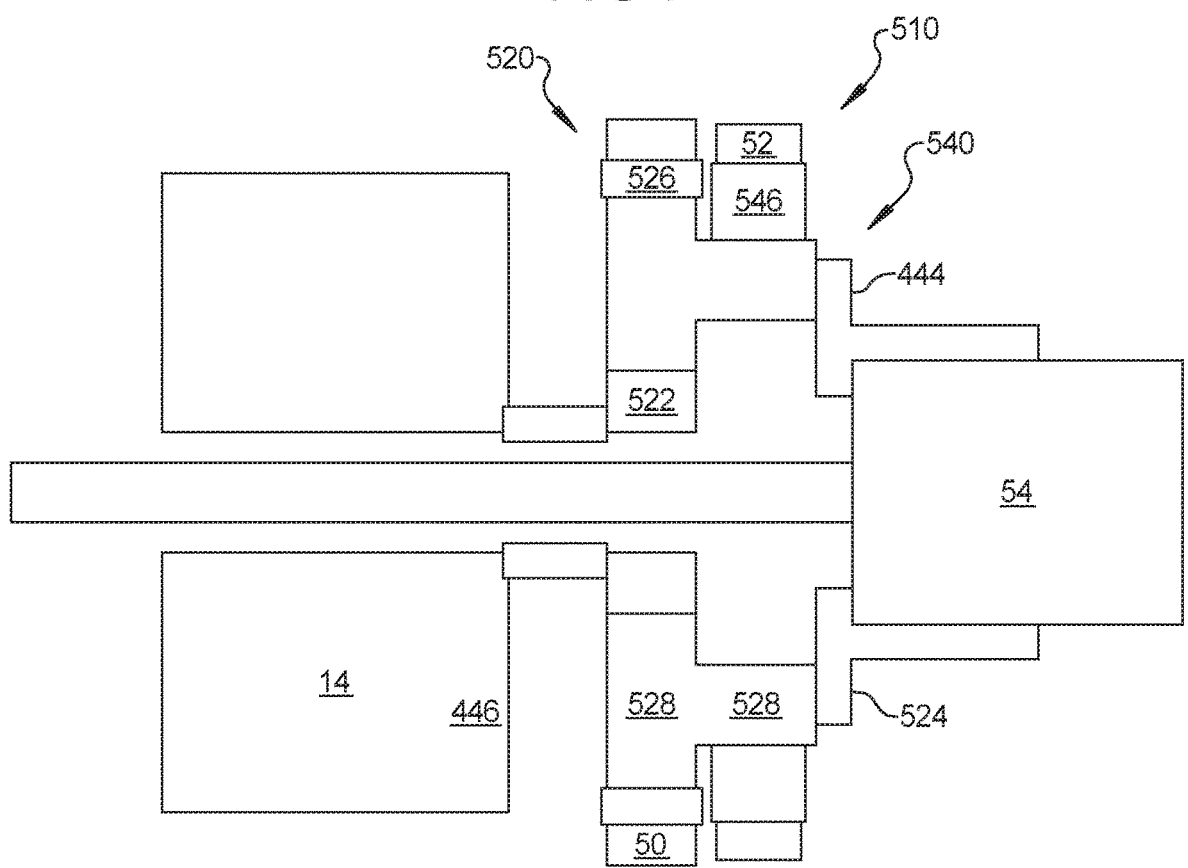
FIG. 8 is a schematic illustration in stick diagram form of the powertrain of FIG. 7.

With reference to FIGS. 7 and 8, an alternative powertrain 510 is shown for a vehicle. The powertrain 510 includes an electric drive unit that includes a single electric motor 14 that is configured to operate as a motor and may also be configured to operate as a generator.

The powertrain 510 further includes a first planetary gear stage 520 and a second planetary gear stage 540 represented in lever form in FIG. 7. The first planetary gear stage 520 includes a sun gear member 522, a planetary carrier member 524 and a ring gear member 526. As is known in the art, the carrier member 524 supports a plurality of stepped planetary gears 528 in meshing engagement with the sun gear member 522 and the ring gear member 526. In the embodiment of FIG. 7, the electric motor 14 is drivingly connected to the sun gear member 522. The ring gear member 526 is connectable to ground 56 by a one-way clutch 52. The planetary carrier member 524 and the stepped planetary gears 528 also serves as a planetary carrier and planetary gear for the second planetary gear stage 540. A ring gear 546 of the second planetary gear stage 540 is meshingly engaged with the stepped planetary gears 528b and is connectable to ground by a selectable one-way clutch 52. The planetary carrier member 524 is drivingly connected to an axle drive system 54 which includes a differential.

The selectable one-way clutch 52 is operable in a closed state to provide high drive torque and is operable to an open state to drive the powertrain 510 in reverse. The one-way clutch 50 allows the powertrain 510 to operate in reverse and to provide regeneration at a low speed ratio.

Figure 9:
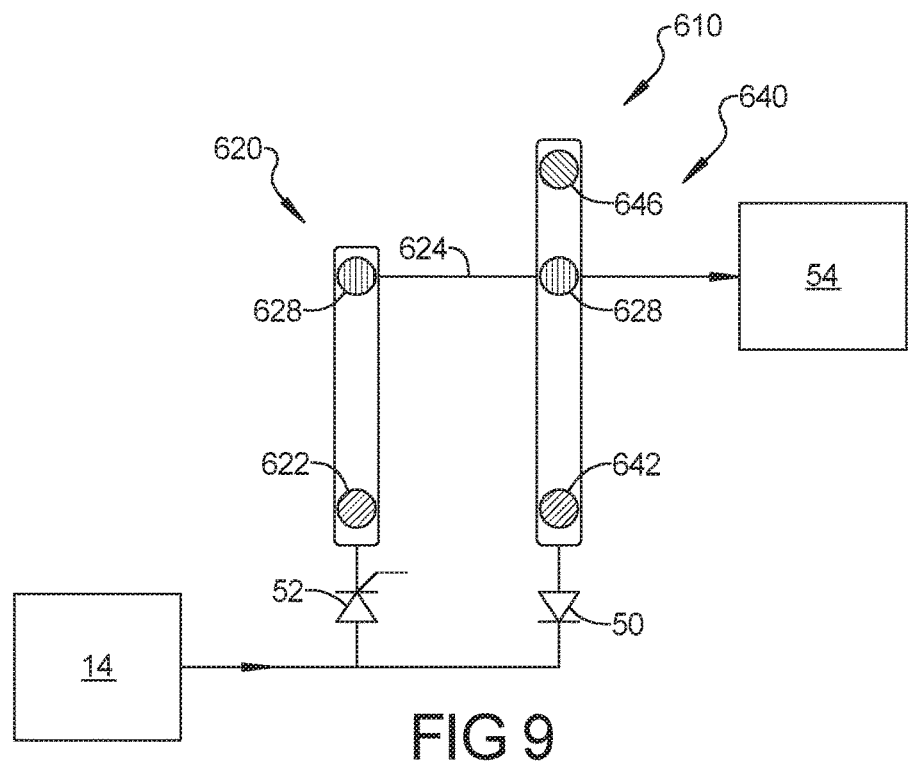
FIG. 9 is a schematic illustration in lever diagram form of a powertrain with an electric drive unit in accordance with an alternative aspect of the present teachings.
Figure 10:
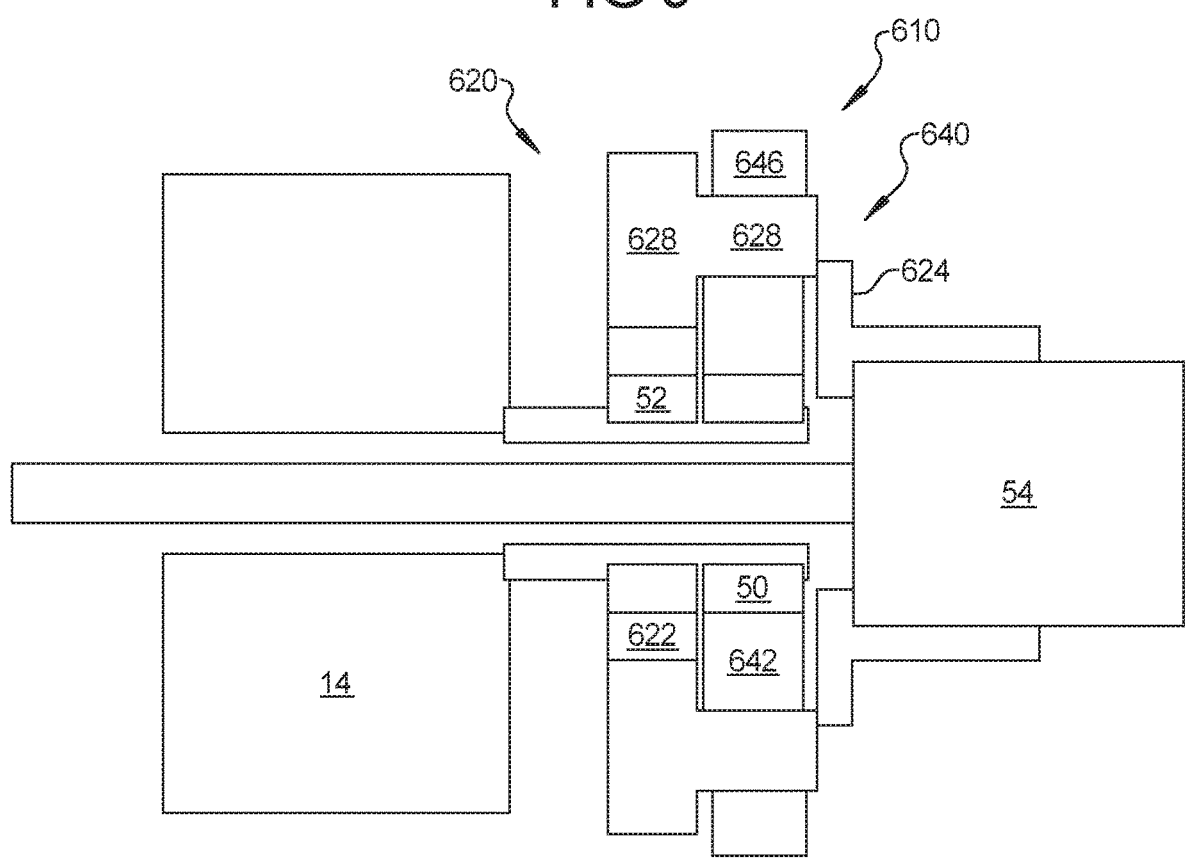
FIG. 10 is a schematic illustration in stick diagram form of the powertrain of FIG. 9.

With reference to FIGS. 9 and 10, an alternative powertrain 610 is shown for a vehicle. The powertrain 610 includes an electric drive unit that includes a single electric motor 14 that is configured to operate as a motor and may also be configured to operate as a generator.

The powertrain 610 further includes a first planetary gear stage 620 and a second planetary gear stage 640 represented in lever form in FIG. 9. The first planetary gear stage 620 includes a sun gear member 622, a planetary carrier member 624. As is known in the art, the carrier member 624 supports a plurality of stepped planetary gears 628 in meshing engagement with the sun gear member 622. In the embodiment of FIG. 9, the electric motor 14 is drivingly connected to the sun gear member 622 by a selectable one-way clutch 52. The electric motor 14 is also connected to a sun gear member 642 of the second planetary gear stage 640 by a one-way clutch 50. A ring gear 646 of the second planetary gear stage 640 is in meshing engagement with the stepped planetary gear members 628. The planetary carrier member 624 is drivingly connected to an axle drive system 54 which includes a differential.

The selectable one-way clutch 52 is operable in a closed state to provide high drive torque and is operable to an open state to drive the powertrain 610 in reverse. The one-way clutch 50 allows the powertrain 610 to operate in reverse and to provide regeneration at a low speed ratio.

Figure 11:
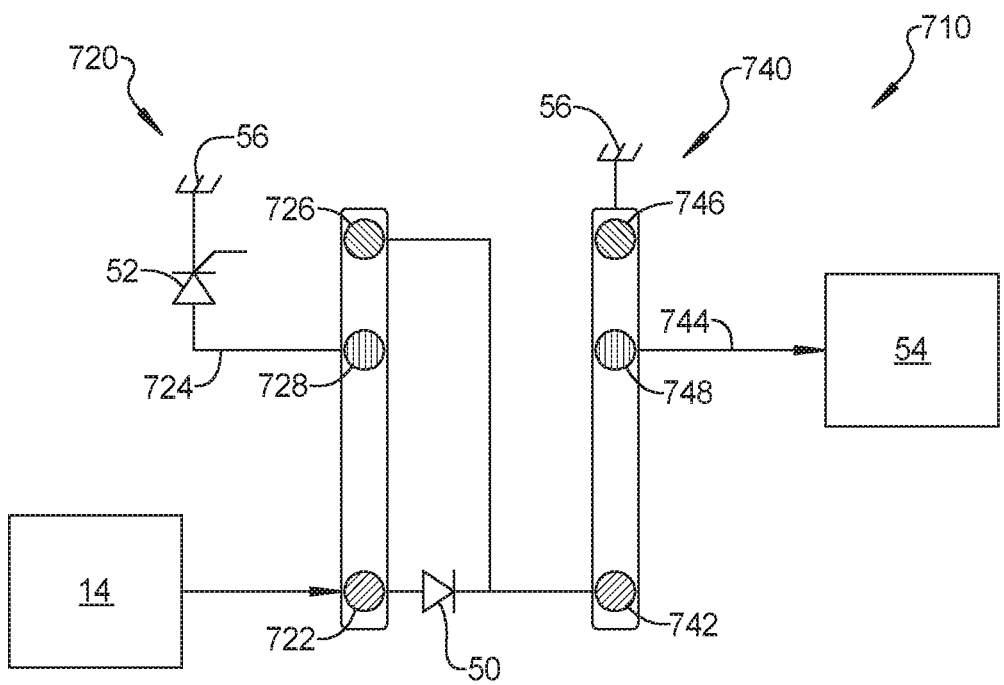
FIG. 11 is a schematic illustration in lever diagram form of a powertrain with an electric drive unit in accordance with an alternative aspect of the present teachings.

With reference to FIG. 11, an alternative powertrain 710 is shown for a vehicle. The powertrain 710 includes an electric drive unit that includes a single electric motor 14 that is configured to operate as a motor and may also be configured to operate as a generator.

The powertrain 710 further includes a first planetary gear stage 720 and a second planetary gear stage 740 represented in lever form in FIG. 11. The first planetary gear stage 720 includes a sun gear member 722, a planetary carrier member 724 and a ring gear member 726. As is known in the art, the carrier member 724 supports a plurality of planetary gears 728 in meshing engagement with the sun gear member 722 and the ring gear member 726. In the embodiment of FIG. 11, the electric motor 14 is drivingly connected to the sun gear member 722. The ring gear member 726 is drivingly connected to a sun gear 742 of the second planetary gear stage 740. The sun gear member 722 is connectable to the ring gear member 726 of the first planetary gear stage 720 and the sun gear member 742 of the second planetary gear stage 740 by a one-way clutch 50. The carrier member 724 of the first planetary gear stage 720 is connectable to ground 56 by a selectable one-way clutch 52. A ring gear 746 of the second planetary gear stage 740 is non-rotatably fixed to the housing 56. A planetary carrier member 744 of the second planetary gear stage 140 supports a plurality of planetary gears 748 in meshing engagement with the sun gear member 742 and the ring gear member 746 and is drivingly connected to an axle drive system 54 which includes a differential.

The selectable one-way clutch 52 is operable in a closed state to provide high drive torque and is operable to an open state to drive the powertrain 710 in reverse. The one-way clutch 50 allows the powertrain 710 to operate in reverse and to provide regeneration at a low speed ratio.

Figure 12:
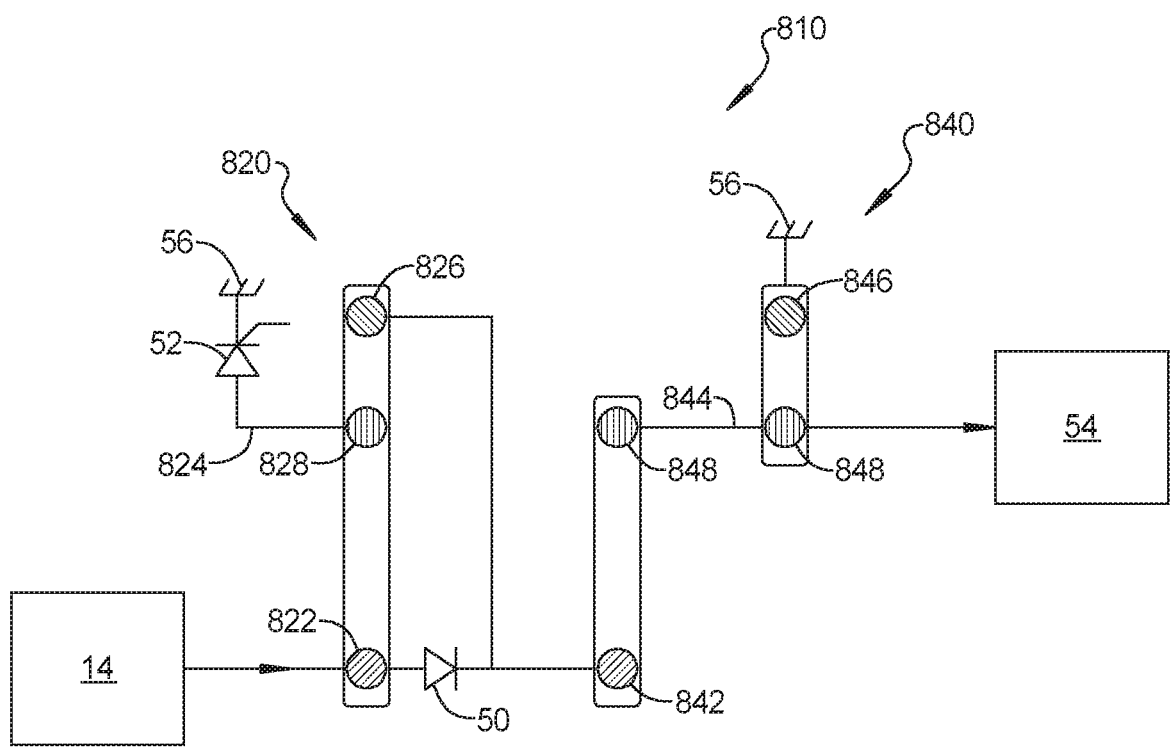
FIG. 12 is a schematic illustration in lever diagram form of a powertrain with an electric drive unit in accordance with an alternative aspect of the present teachings.

With reference to FIG. 12, an alternative powertrain 810 is shown for a vehicle. The powertrain 810 includes an electric drive unit that includes a single electric motor 14 that is configured to operate as a motor and may also be configured to operate as a generator.

The powertrain 810 further includes a first planetary gear stage 820 and a second planetary gear stage 840 represented in lever form in FIG. 12. The first planetary gear stage 820 includes a sun gear member 822, a planetary carrier member 824 and a ring gear member 826. As is known in the art, the carrier member 824 supports a plurality of planetary gears 828 in meshing engagement with the sun gear member 822 and the ring gear member 826. In the embodiment of FIG. 12, the electric motor 14 is drivingly connected to the sun gear member 822. The carrier member 824 is connectable to ground 56 by a selectable one-way clutch 52. The sun gear member 822 of the first planetary gear stage 820 is connected to the ring gear member 826 of the first planetary gear stage 820 and to a sun gear member 842 of the second planetary gear stage 840 by a one-way clutch 50. A ring gear 846 of the second planetary gear stage 840 is non-rotatably fixed to housing 56. A planetary carrier member 844 of the second planetary gear stage 840 supports a plurality of stepped planetary gears 848 in meshing engagement with the sun gear member 842 and the ring gear member 846 and is drivingly connected to an axle drive system 54 which includes a differential.

The selectable one-way clutch 52 is operable in a closed state to provide high drive torque and is operable to an open state to drive the powertrain 810 in reverse. The one-way clutch 50 allows the powertrain 810 to operate in reverse and to provide regeneration at a low speed ratio.

Figure 13:
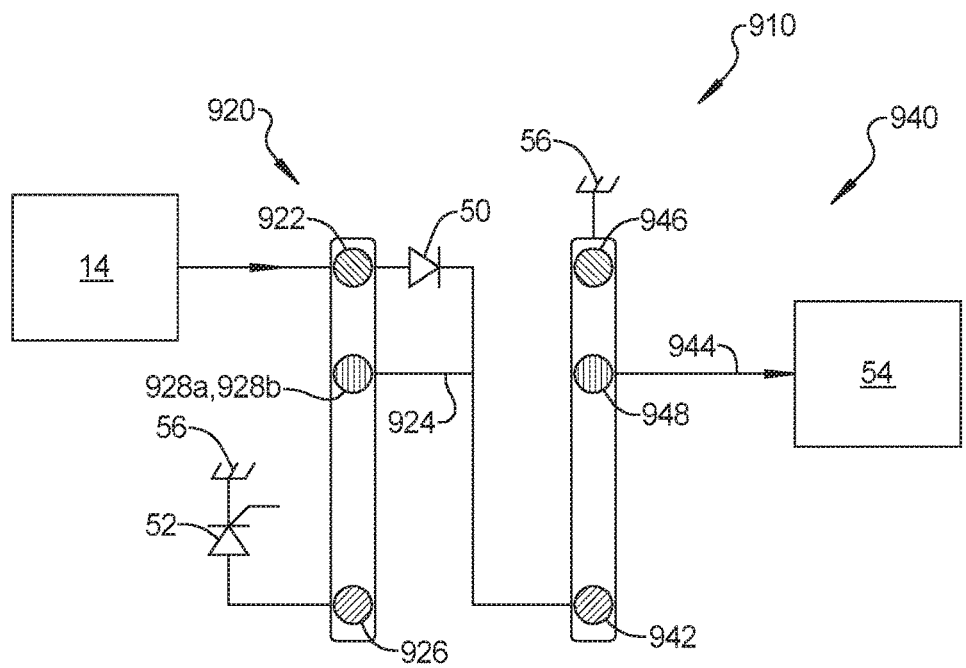
FIG. 13 is a schematic illustration in lever diagram form of a powertrain with an electric drive unit in accordance with an alternative aspect of the present teachings.
Figure 14:
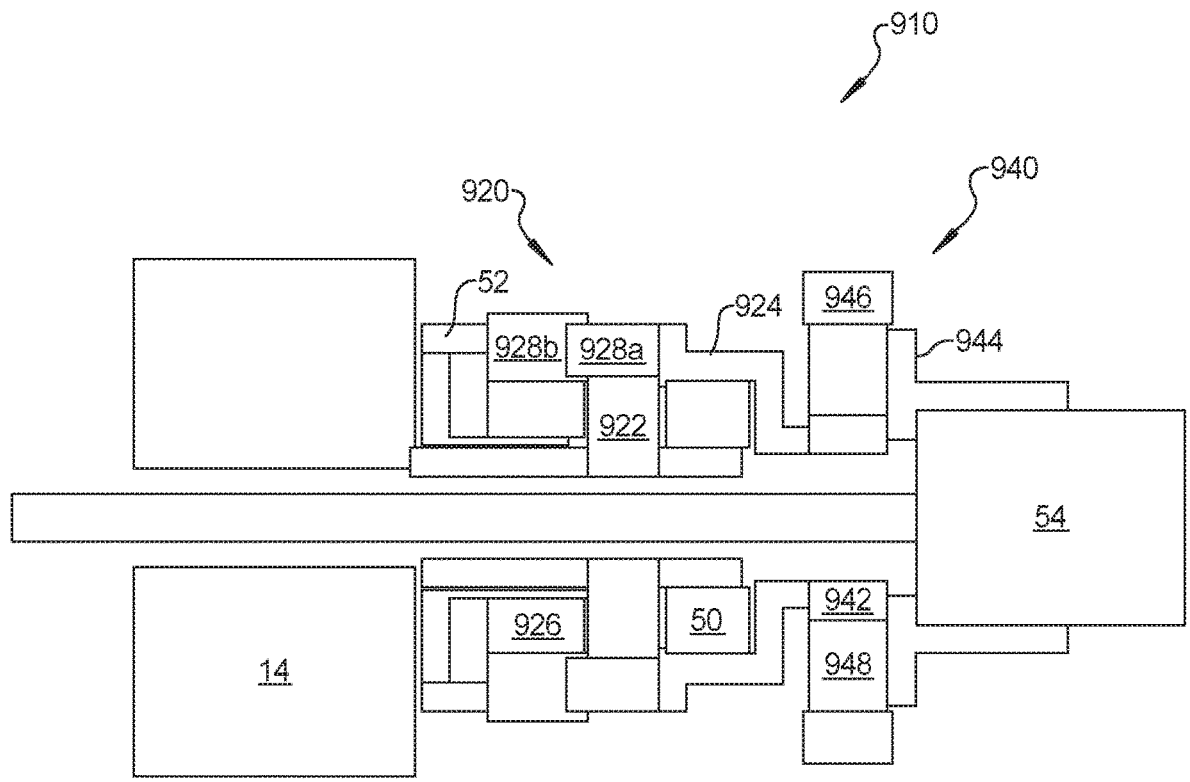
FIG. 14 is a schematic illustration in stick diagram form of the powertrain of FIG. 13.

With reference to FIGS. 13 and 14, an alternative powertrain 910 is shown for a vehicle. The powertrain 910 includes an electric drive unit that includes a single electric motor 14 that is configured to operate as a motor and may also be configured to operate as a generator.

The powertrain 910 further includes a first planetary gear stage 920 and a second planetary gear stage 940 represented in lever form in FIG. 13. The first planetary gear stage 920 includes a first sun gear member 922, a planetary carrier member 924 and a second sun gear member 926. As is known in the art, the carrier member 924 supports a plurality of planetary gears 928a, 928b. The plurality of planetary gears 928a is in meshing engagement with the first sun gear member 922 and the plurality of planetary gears 928b, which are in meshing engagement with the second sun gear member 926. In the embodiment of FIG. 13, the electric motor 14 is drivingly connected to the first sun gear member 922. The second sun gear member 926 is connectable to ground 56 by a selectable one-way clutch 52. The first sun gear member 922 of the first planetary gear stage 920 is connected to the planetary carrier member 924 of the first planetary gear stage 920 and to a sun gear member 942 of the second planetary gear stage 940 by a one-way clutch 50. A ring gear 946 of the second planetary gear stage 940 is non-rotatably fixed to housing 56. A planetary carrier member 944 of the second planetary gear stage 940 supports a plurality of planetary gears 948 in meshing engagement with the sun gear member 942 and the ring gear member 946 and is drivingly connected to an axle drive system 54 which includes a differential.

The selectable one-way clutch 52 is operable in a closed state to provide high drive torque and is operable to an open state to drive the powertrain 910 in reverse. The one-way clutch 50 allows the powertrain 910 to operate in reverse and to provide regeneration at a low speed ratio.

Figure 15:
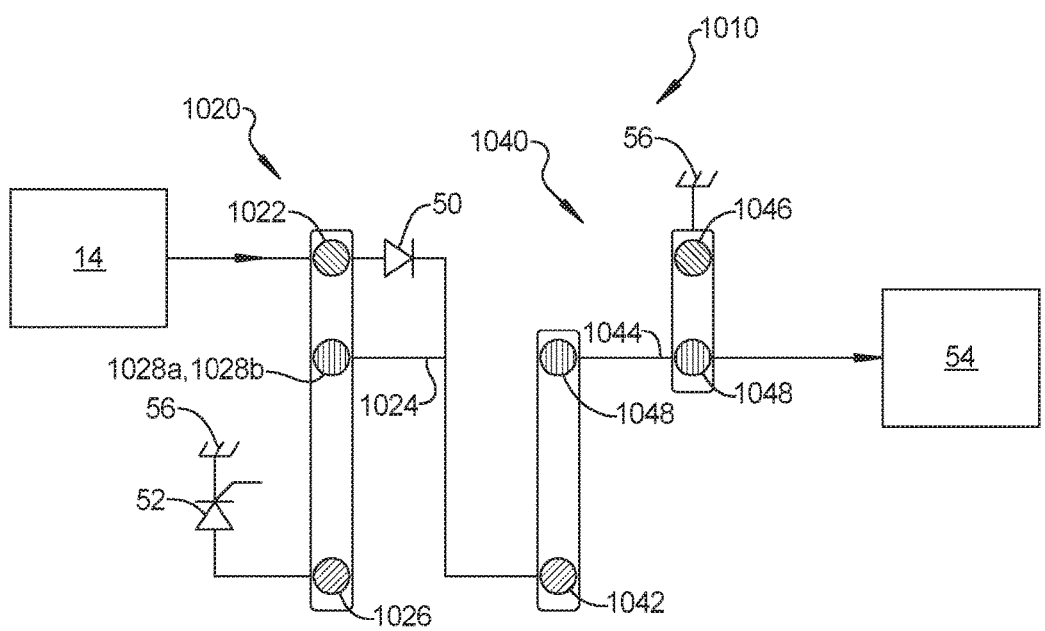
FIG. 15 is a schematic illustration in lever diagram form of a powertrain with an electric drive unit in accordance with an alternative aspect of the present teachings.
Figure 16:
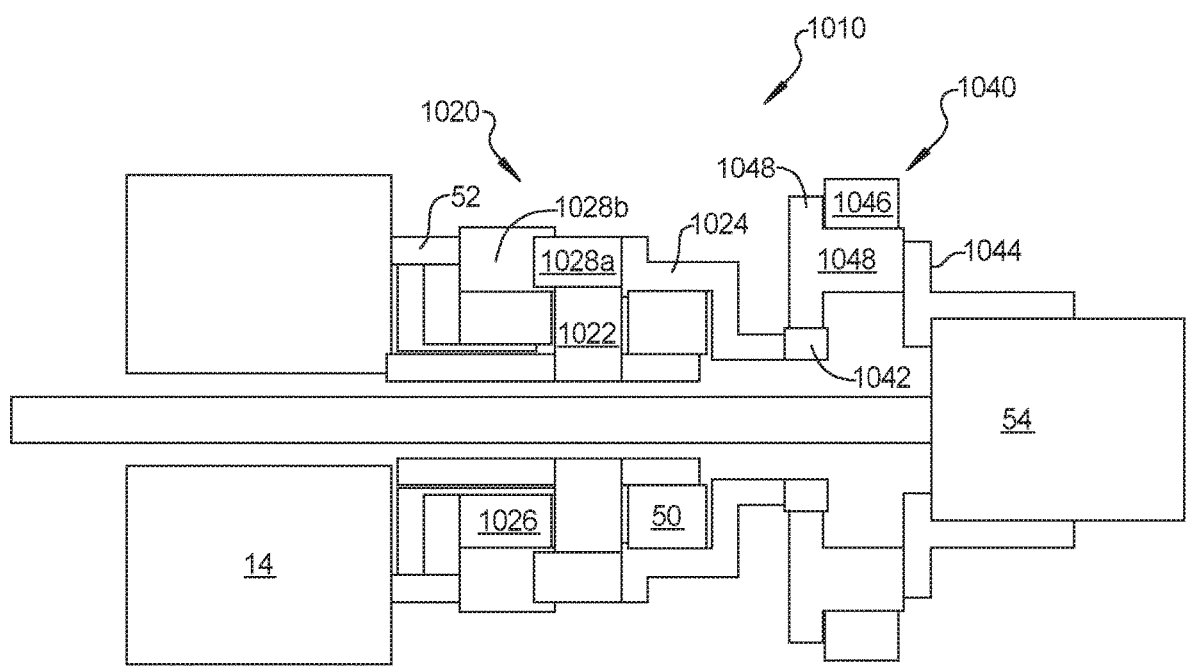
FIG. 16 is a schematic illustration in stick diagram form of the powertrain of FIG. 15.

With reference to FIGS. 15 and 16, an alternative powertrain 1010 is shown for a vehicle. The powertrain 1010 includes an electric drive unit that includes a single electric motor 14 that is configured to operate as a motor and may also be configured to operate as a generator.

The powertrain 1010 further includes a first planetary gear stage 1020 and a second planetary gear stage 1040 represented in lever form in FIG. 15. The first planetary gear stage 1020 includes a first sun gear member 1022, a planetary carrier member 1024 and a second sun gear member 1026. As is known in the art, the carrier member 1024 supports a plurality of planetary gears 1028a, 1028b. The plurality of planetary gears 1028a are in meshing engagement with the first sun gear member 1022 and the plurality of planetary gears 1028b, which are in meshing engagement with the second sun gear member 1026. In the embodiment of FIG. 15, the electric motor 14 is drivingly connected to the first sun gear member 1022. The second sun gear member 1026 is connectable to ground 56 by a selectable one-way clutch 52. The first sun gear member 1022 of the first planetary gear stage 1020 is connected to the planetary carrier member 1024 of the first planetary gear stage 1020 and to a sun gear member 1042 of the second planetary gear stage 1040 by a one-way clutch 50. A ring gear 1046 of the second planetary gear stage 1040 is non-rotatably fixed to housing 56. A planetary carrier member 1044 of the second planetary gear stage 1040 supports a plurality of stepped planetary gears 1048a, 1048b in meshing engagement with the sun gear member 1042 and the ring gear member 1046 and is drivingly connected to an axle drive system 54 which includes a differential.

The selectable one-way clutch 52 is operable in a closed state to provide high drive torque and is operable to an open state to drive the powertrain 1010 in reverse. The one-way clutch 50 allows the powertrain 1010 to operate in reverse and to provide regeneration at a low speed ratio.

Figure 17:
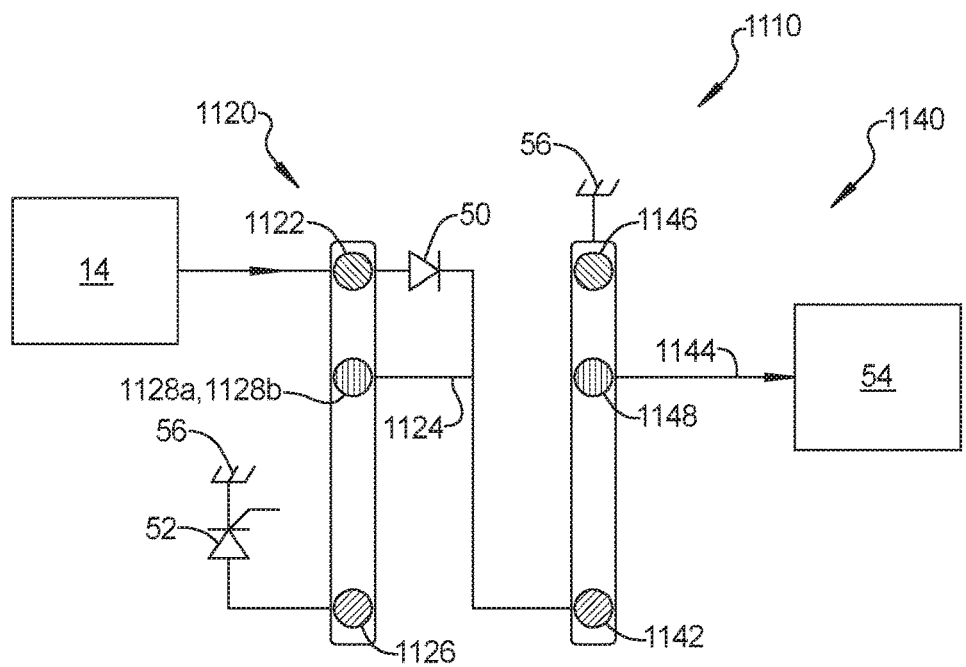
FIG. 17 is a schematic illustration in lever diagram form of a powertrain with an electric drive unit in accordance with an alternative aspect of the present teachings.
Figure 18:
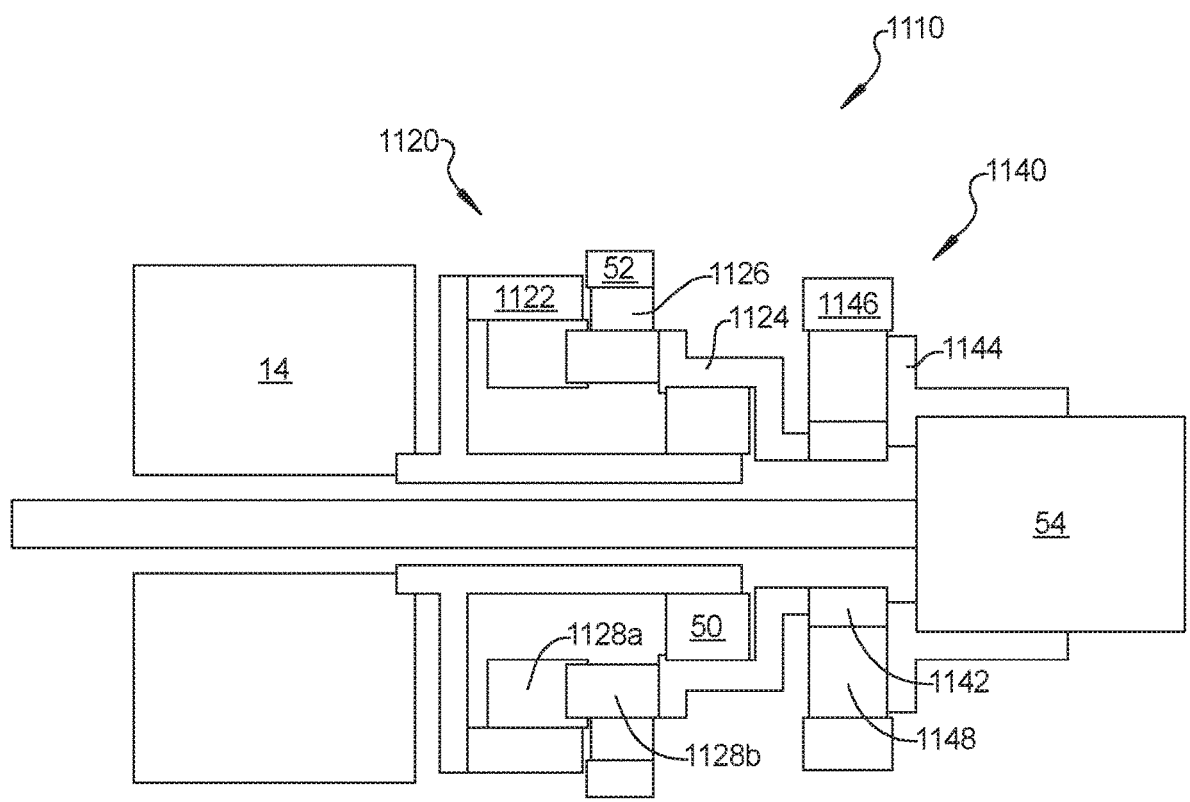
FIG. 18 is a schematic illustration in stick diagram form of the powertrain of FIG. 17.

With reference to FIGS. 17 and 18, an alternative powertrain 1110 is shown for a vehicle. The powertrain 1110 includes an electric drive unit that includes a single electric motor 14 that is configured to operate as a motor and may also be configured to operate as a generator.

The powertrain 1110 further includes a first planetary gear stage 1120 and a second planetary gear stage 1140 represented in lever form in FIG. 17. The first planetary gear stage 1120 includes a first ring gear member 1122, a planetary carrier member 1124 and a second ring gear member 1126. As is known in the art, the carrier member 1124 supports a plurality of planetary gears 1128a, 1128b. The plurality of planetary gears 1128a are in meshing engagement with the first ring gear member 1122 and the plurality of planetary gears 1128b, which are in meshing engagement with the second ring gear member 1126. In the embodiment of FIG. 17, the electric motor 14 is drivingly connected to the first ring gear member 1122. The second ring gear member 1126 is connectable to ground 56 by a selectable one-way clutch 52. The first ring gear member 1122 of the first planetary gear stage 1120 is connected to the planetary carrier member 1124 of the first planetary gear stage 1120 and to a sun gear member 1142 of the second planetary gear stage 1140 by a one-way clutch 50. A ring gear 1146 of the second planetary gear stage 1140 is non-rotatably fixed to housing 56. A planetary carrier member 1144 of the second planetary gear stage 1140 supports a plurality of planetary gears 1148 in meshing engagement with the sun gear member 1142 and the ring gear member 1146 and is drivingly connected to an axle drive system 54 which includes a differential.

The selectable one-way clutch 52 is operable in a closed state to provide high drive torque and is operable to an open state to drive the powertrain 1110 in reverse. The one-way clutch 50 allows the powertrain 1110 to operate in reverse and to provide regeneration at a low speed ratio.

Figure 19:
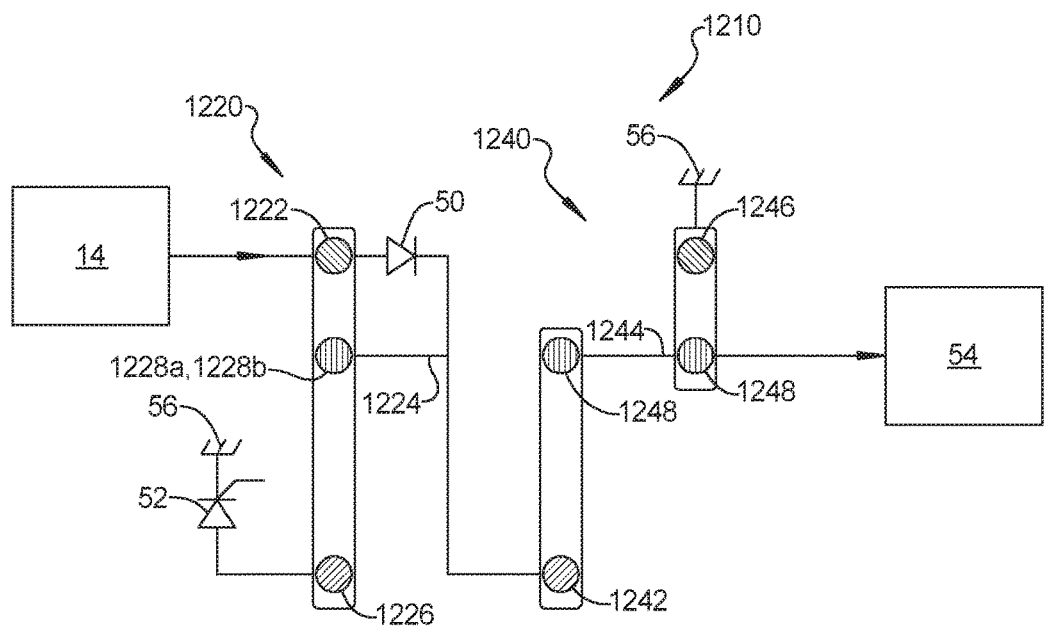
FIG. 19 is a schematic illustration in lever diagram form of a powertrain with an electric drive unit in accordance with an alternative aspect of the present teachings.
Figure 20:
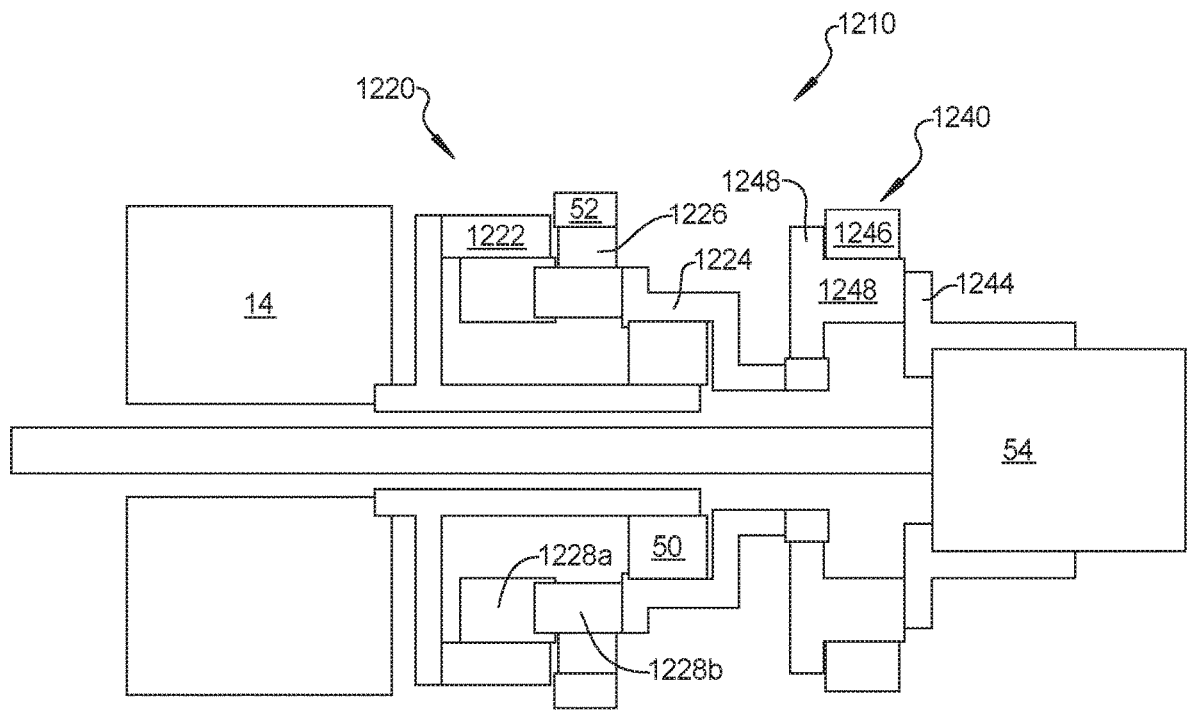
FIG. 20 is a schematic illustration in stick diagram form of the powertrain of FIG. 19.

With reference to FIGS. 19 and 20, an alternative powertrain 1210 is shown for a vehicle. The powertrain 1210 includes an electric drive unit that includes a single electric motor 14 that is configured to operate as a motor and may also be configured to operate as a generator.

The powertrain 1210 further includes a first planetary gear stage 1220 and a second planetary gear stage 1240 represented in lever form in FIG. 19. The first planetary gear stage 1220 includes a first ring gear member 1222, a planetary carrier member 1224 and a second ring gear member 1226. As is known in the art, the carrier member 1224 supports a plurality of planetary gears 1228a, 1228b. The plurality of planetary gears 1228a are in meshing engagement with the first ring gear member 1222 and the plurality of planetary gears 1228b, which are in meshing engagement with the second ring gear member 1226. In the embodiment of FIG. 19, the electric motor 14 is drivingly connected to the first ring gear member 1222. The second ring gear member 1226 is connectable to ground 56 by a selectable one-way clutch 52. The first ring gear member 1222 of the first planetary gear stage 1220 is connected to the planetary carrier member 1224 of the first planetary gear stage 1220 and to a sun gear member 1242 of the second planetary gear stage 1240 by a one-way clutch 50. A ring gear 1246 of the second planetary gear stage 1240 is non-rotatably fixed to housing 56. A planetary carrier member 1244 of the second planetary gear stage 1240 supports a plurality of stepped planetary gears 1248 in meshing engagement with the sun gear member 1242 and the ring gear member 1246 and is drivingly connected to an axle drive system 54 which includes a differential.

The selectable one-way clutch 52 is operable in a closed state to provide high drive torque and is operable to an open state to drive the powertrain 1210 in reverse. The one-way clutch 50 allows the powertrain 1210 to operate in reverse and to provide regeneration at a low speed ratio.

Figure 21:
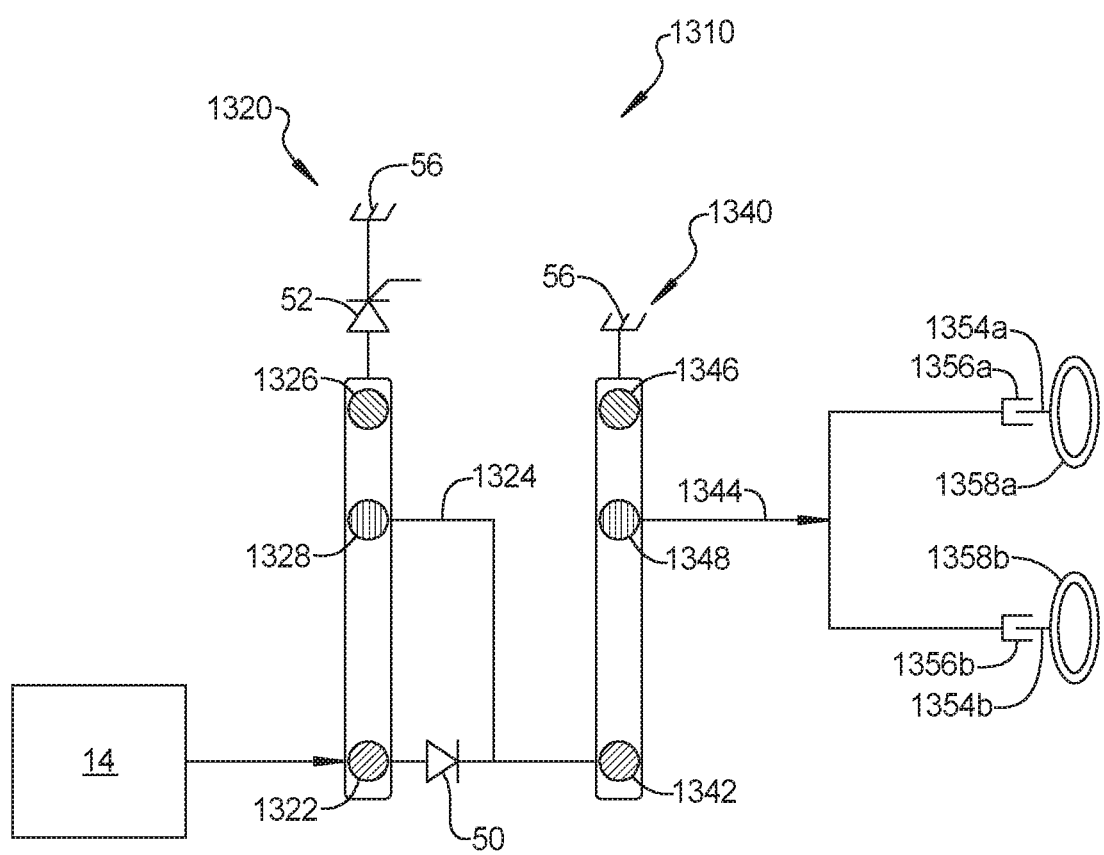
FIG. 21 is a schematic illustration in lever diagram form of a powertrain with an electric drive unit in accordance with an alternative aspect of the present teachings.

With reference to FIG. 21, an alternative powertrain 1310 is shown for a vehicle. The powertrain 1310 includes an electric drive unit that includes a single electric motor 14 that is configured to operate as a motor and may also be configured to operate as a generator.

The powertrain 1310 further includes a first planetary gear stage 1320 and a second planetary gear stage 1340 represented in lever form in FIG. 21. The first planetary gear stage 1320 includes a sun gear member 1322, a planetary carrier member 1324 and a ring gear member 1326. As is known in the art, the carrier member 1324 supports a plurality of planetary gears 1328 in meshing engagement with the sun gear member 1322 and the ring gear member 1326. In the embodiment of FIG. 21, the electric motor 14 is drivingly connected to the sun gear member 1322. The ring gear member 1326 is connectable to ground 56 by a selectable one-way clutch 52. The sun gear member 1322 of the first planetary gear stage 1320 is connected to the planetary carrier member 1324 of the first planetary gear stage 1320 and to a sun gear member 1342 of the second planetary gear stage 1340 by a one-way clutch 50. A ring gear 1346 of the second planetary gear stage 1340 is non-rotatably fixed to housing 56. A planetary carrier member 1344 of the second planetary gear stage 1340 supports a plurality of planetary gears 1348 in meshing engagement with the sun gear member 1342 and the ring gear member 1346 and is drivingly connected to a pair of drive axles 1354a, 1354b via a pair of twin clutches 1356a, 1356b for providing torque vectoring to a pair of drive wheels 1358a, 1358b.

The selectable one-way clutch 52 is operable in a closed state to provide high drive torque and is operable to an open state to drive the powertrain 1310 in reverse. The one-way clutch 50 allows the powertrain 1310 to operate in reverse and to provide regeneration at a low speed ratio.

Figure 22:
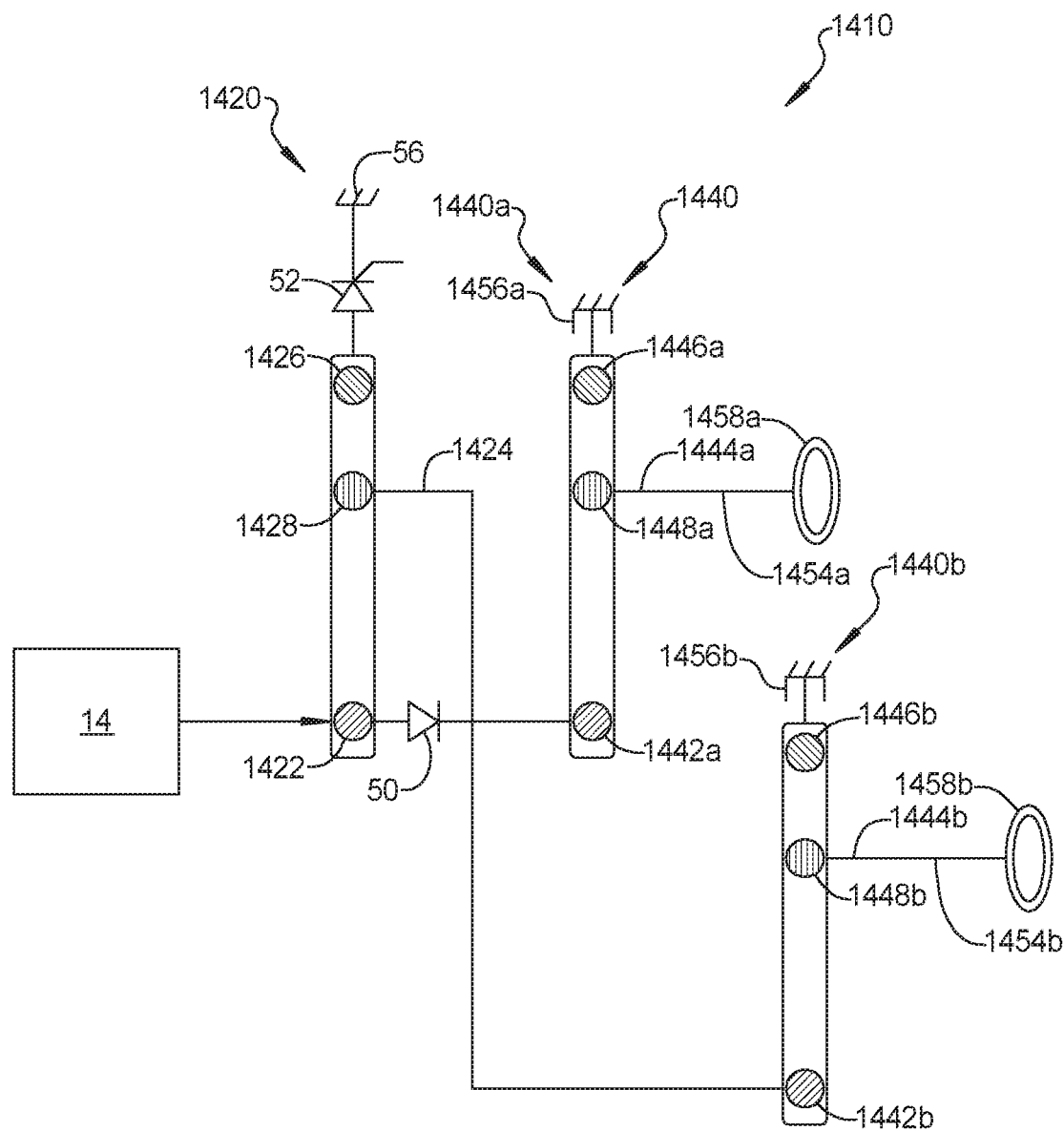
FIG. 22 is a schematic illustration in lever diagram form of a powertrain with an electric drive unit in accordance with an alternative aspect of the present teachings.

With reference to FIG. 22, an alternative powertrain 1410 is shown for a vehicle. The powertrain 1410 includes an electric drive unit that includes a single electric motor 14 that is configured to operate as a motor and may also be configured to operate as a generator.

The powertrain 1410 further includes a first planetary gear stage 1420 and a second planetary gear stage 1440 represented in lever form in FIG. 22. The first planetary gear stage 1420 includes a sun gear member 1422, a planetary carrier member 1424 and a ring gear member 1426. As is known in the art, the carrier member 1424 supports a plurality of planetary gears 1428 in meshing engagement with the sun gear member 1422 and the ring gear member 1426. In the embodiment of FIG. 22, the electric motor 14 is drivingly connected to the sun gear member 1422. The ring gear member 1426 is connectable to ground 56 by a selectable one-way clutch 52. The sun gear member 1422 of the first planetary gear stage 1420 is connected to the planetary carrier member 1424 of the first planetary gear stage 1420 and to a pair of sun gear members 1442a, 1442b of a pair of planetary gear sets 1440a, 1440b of the second planetary gear stage 1440 by a one-way clutch 50. A ring gear 1446a, 1446b of the pair of planetary gear sets 1440a, 1440b are selectively fixed via a pair of twin clutches 1456a, 1456b. A pair of planetary carrier members 1444a, 1444b of the planetary gear sets 1440a, 1440b each support a plurality of planetary gears 1448a, 1448b in meshing engagement with the sun gears member 1442a, 1442b and the ring gear members 1446a, 1446b and are drivingly connected to a pair of drive axles 1454*a*, 1454*b* via the pair of twin clutches 1456*a*, 1456*b* for providing torque vectoring to a pair of drive wheels 1458*a*, 1458*b*.

The selectable one-way clutch 52 is operable in a closed state to provide high drive torque and is operable to an open state to drive the powertrain 1410 in reverse. The one-way clutch 50 allows the powertrain 1410 to operate in reverse and to provide regeneration at a low speed ratio.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A powertrain comprising:
   an electric motor;
   a first gear stage having a first rotatable member drivingly engagable to the electric motor and at least one second rotatable member;
   a second gear stage having a third rotatable member drivingly engagable to the electric motor and a fourth rotatable member, wherein the second rotatable member and the fourth rotatable member are drivingly connected to an output member;
   a passive one-way clutch associated with the first gear stage and a selectable one-way clutch associated with the second gear stage for varying operation of the first and second gear stages based upon an operation state of the selectable one-way clutch and a direction of rotation of the electric motor.

2. The powertrain according to claim 1, wherein the first rotatable member and the third rotatable member are mounted to a drive shaft of the electric motor and the second and fourth rotatable members are mounted to a lay shaft.

3. The powertrain according to claim 1, wherein the first gear stage is a first planetary gear stage and the second gear stage is a second planetary gear stage.

4. The powertrain according to claim 3, wherein the first rotatable member and the second rotatable member are components of the first planetary gear stage and the third rotatable member and the fourth rotatable member are components of the second planetary gear stage.

5. A powertrain comprising:
   an electric motor;
   a first planetary gear stage having a first rotatable member drivingly connected to the electric motor and at least one second rotatable member;
   a second planetary gear stage having a third rotatable member drivingly connected to the at least one second rotatable member and at least one fourth rotatable member, wherein one of the third rotatable member or the fourth rotatable member is connected to an output member;
   a passive one-way clutch and a selectable one-way clutch associated with at least one of the first and second planetary gear stages for varying operation of the first and second planetary gear stages based upon an operation state of the selectable one-way clutch and a direction of rotation of the electric motor.

6. The powertrain according to claim 5, wherein the first rotatable member is a sun gear member and the second rotatable member is a ring gear member.

7. The powertrain according to claim 5, wherein the first rotatable member is a sun gear member and the second rotatable member is a carrier member.

8. The powertrain according to claim 5, wherein the first rotatable member is a ring gear member and the second rotatable member is a carrier member.

9. The powertrain according to claim 5, wherein the third rotatable member is a sun gear member and the fourth rotatable member is a ring gear member.

10. The powertrain according to claim 5, wherein the third rotatable member is a carrier member and the fourth rotatable member is a ring gear member.

11. The powertrain according to claim 5, wherein the third rotatable member is a sun gear member and the fourth rotatable member is a carrier member.

12. The powertrain according to claim 5, wherein the passive one-way clutch is disposed between the electric motor and the first rotatable member of the first planetary gear stage.

13. The powertrain according to claim 5, wherein the passive one-way clutch is disposed between the first rotatable member and the third rotatable member.

14. The powertrain according to claim 5, wherein the first planetary gear stage includes a fifth rotatable member and the passive one-way clutch is disposed between the fifth rotatable member and a housing.

15. The powertrain according to claim 5, wherein the selectable one-way clutch is disposed between the electric motor and the first rotatable member.

16. The powertrain according to claim 5, wherein the first planetary gear stage includes a fifth rotatable member and the selectable one-way clutch is disposed between the fifth rotatable member and a housing.

17. The powertrain according to claim 5, wherein the selectable one-way clutch is disposed between the fourth rotatable member and a housing.

18. The powertrain according to claim 5, wherein said output member includes a differential connected to a pair of drive axles.

19. The powertrain according to claim 5, wherein said output member includes a drive axle.

20. The powertrain according to claim 5, wherein said output member includes a pair of friction clutches connected to a pair of drive axles.

21. The powertrain according to claim 5, wherein a third planetary gear stage is drivingly connected to the second rotatable member and a first and second friction clutch selectively connect a member of the second and third planetary gear stages, respectively, to a housing.

* * * * *